United States Patent [19]

Gundlach

[11] Patent Number: 5,105,937
[45] Date of Patent: Apr. 21, 1992

[54] CLOSED HINGE BELT WITH UNIQUE TRACKING SUITABLE FOR ABRASIVE ENVIRONMENTS

[75] Inventor: James O. Gundlach, New Orleans, La.

[73] Assignee: The Laitram Corporation, Harahan, La.

[21] Appl. No.: 694,420

[22] Filed: May 1, 1991

[51] Int. Cl.$^5$ .............................................. B65G 17/06
[52] U.S. Cl. ................... 198/853; 198/840; 198/834
[58] Field of Search ................. 198/834, 840, 853; 474/156, 157, 161, 207, 212, 213

[56] References Cited

U.S. PATENT DOCUMENTS

| | | | |
|---|---|---|---|
| 4,051,949 | 10/1977 | Lapeyre | 198/853 |
| 4,171,045 | 10/1979 | Lapeyre | 198/853 |
| 4,213,527 | 7/1980 | Lapeyre et al. | 198/853 |
| 4,729,469 | 3/1988 | Lapeyre | 198/834 |
| 4,925,016 | 5/1990 | Lapeyre | 198/853 |
| 4,993,543 | 2/1991 | Lapeyre | 198/834 |

Primary Examiner—Joseph E. Valenza
Attorney, Agent, or Firm—James T. Cronvich

[57] ABSTRACT

A closed-hinge conveyor belt constructed of interconnected modules in which the tracking of drive sprockets is achieved by belt link end structure forming tracking recesses that mate with the tracking teeth of drive sprockets. In conventional open-hinge belts in which tracking is so achieved, tracking recesses are formed in link end structure that forms pivot rod bearing holes only partly surrounded by the link end structure, thereby exposing the pivot rod directly to contamination in such an open-hinge construction. According to this invention, shallow tracking recesses are formed in link end structure that forms pivot rod bearing holes to ensure that no part of the pivot rod across the width of the belt is left openly exposed, but rather is surrounded by link end structure. Thus, the access of grit and grime to the pivot rod in such a closed-hinge belt is restricted, thereby affording longer belt operating life, particularly in abrasive environments.

17 Claims, 4 Drawing Sheets

CLOSED HINGE BELT WITH UNIQUE TRACKING SUITABLE FOR ABRASIVE ENVIRONMENTS

TECHNICAL FIELD

The invention relates to modular plastic conveyor belts and, more particularly, to conveyor systems having hinging structure particularly adapted for use in abrasive environments.

BACKGROUND ART

When a conveyor belt is required to operate in environmentally uncontrolled conditions where it is subjected to abrasives, its life span is considerably shortened by frictional contact between relatively movable parts in the presence of the abrasives. Even in the absence of grit and other abrasives, belt wear in the vicinity of relatively movable parts is the most significant factor in terminating the useful life span of the belt.

In modular conveyor belts, modules are traditionally interdigitated at opposite ends and linked together by means of pivot rods extending through the interlaced belt link ends in a pattern forming a conveyor surface. To pass over sprockets, the modules need to have articulated hinges, for example, conventionally provided by means of the pivot rods.

A major problem encountered is the accumulation of dirt and grit in the vicinity of the pivot pin wear surfaces, causing accelerated abrasive wear and early belt failure.

An excellent conveyor system that is drivable in both directions, easy to clean, and easy to track is disclosed in J. M. Lapeyre's U.S. Pat. No. 4,925,016, entitled "Heavy Duty Modular Conveyor Belt And Sprocket With Unique Tracking," issued May 15, 1990, and assigned to the assignee of this invention. The modular plastic belt disclosed therein is a heavy-duty modular conveyor belt that has a smooth load-carrying surface and uses a single transverse tooth member in each module as the means for driving the belt. The belt comprises a number of individual modules pivotally joined by pivot rods. The modules, preferably formed by injection molding, include link ends on both ends, which intermesh with link ends of other modules. Pivot rods in holes formed by apertures in the intermeshed link ends hold the belt together and permit hinged articulation about a sprocket. The belt is driven by a sprocket that contacts the transverse tooth member of the belt at the center of the pitch line of each module. The single tooth member used is easy to clean because it has few hard-to-reach surfaces. Tracking is provided by separate sprocket teeth received in spaces between intermeshed link ends of adjacent modules. The tracking spaces provided by the disclosed belt are formed between each link end by sizing the thickness of the sprocket-side portion of each link end less than the thickness of the load-side portion. Because the pivot aperture of each link end is in the narrower sprocket-side portion, the pivot rod bearing structure in the link ends is discontinuous about the pivot rod, thereby exposing the pivot rod to dirt and grime as in Lapeyre U.S. Pat. No. 4,925,016. Such pivot rod bearing structure is herein termed "open hinge." Conversely, "closed hinge" refers to structure that encompasses the entire pivot rod so that it is not exposed to dirt and grime. Such contamination between the pivot rod bearing structure and the movable pivot rods can severely shorten the useful lifetime of the belt.

Closed-hinge conveyor belts providing tracking in close proximity to the hinges by means of sprockets having teeth that are received in the belt structure are exemplified in J. M. Lapeyre's U.S. Pat. No. 3,870,141, issued Mar. 11, 1975, and entitled "Modular Belt" and in U.S. Pat. No. 3,724,285, issued Apr. 3, 1973, entitled "Conveyor Drive," and reissued Jul. 22, 1980 under Reissue No. Re. 30,341. None of the prior art references, all of which are assigned to the assignee of this invention, however, shows a belt with tracking spaces provided by a recess in the link ends for receiving the tracking teeth of sprockets.

It has been conventional in the prior art as represented in the aforementioned Lapeyre U.S. Pat. No. 4,952,016, for example, to form notches in the link ends for accommodating mating tracking teeth, resulting in open hinges exposing pivot rods to grime and grit. Thus, belt systems employing tracking teeth operable in notches in the link end structure otherwise normally surrounding the pivot rods have had short lives and are not adaptable for use in abrasive environments.

Accordingly, along with the general objective of providing improved conveyor belt systems with tracking means that resolve the foregoing problems, it is the specific objective of this invention to produce link end hinging structure having tracking tooth notches adapted for use in abrasive environments.

DISCLOSURE OF THE INVENTION

The invention is incorporated in a preferred belt conveyor system embodiment of a modular plastic belt driven by drive sprockets having tracking teeth for interfitting into accommodating notches in link end structure surrounding a pivot rod, wherein the passageway for the pivot rods is completely surrounded by plastic across the width of the belt. The individual belt modules have link ends joined by an integrally molded connecting structure forming the load-carrying surface of the belt. Modules are linked together by pivot rods through apertures in the intermeshed link ends. The load-side portion of each link end has a width just slightly less than the spacing between link ends such that the load-side portions of intermeshed link ends are substantially in contact.

The sprocket-side surface of the connecting structure of the belt modules, which is opposite the load-carrying surface, includes a tooth member integrally molded and extending transverse to the connecting structure almost midway between the link ends. In a preferred embodiment, the tooth member extends the full width of each module and includes driving surfaces on opposite sides such that the modules and a belt constructed of such modules can be driven in two directions. Furthermore, in a belt constructed of such modules the full-width tooth members of side-by-side connected modules align to form a single substantially continuous tooth member across the width of the belt. Such a continuous tooth member is much easier to clean than a multiplicity of individual tooth members.

In the preferred embodiment, the sprocket-side portion of each link end is not so wide as the load-side portion. The resulting notch, or space, between sprocket-side portions of intermeshed link ends is suitable for receiving tracking teeth located around the circumference of a drive sprocket. With the sprocket-side portion more or less midway from each side of the load-side portion, the resulting spaces are located between every junction of intermeshed link ends, providing many positions for sprocket placement.

The pivot rod aperture is formed in the load-side portion of each link end. In this way, the pivot rod apertures of intermeshed link ends form a closed-hinge pivot rod hole transversely along the belt. To contaminate the pivot rod hole, grit must travel along paths through the extremely narrow gaps between the close-fitting load-side portions of the link ends.

In another embodiment, providing more abrasion resistance, the narrower sprocket-side portion of each link end has one side in common with the load-side portion. In this way, notches forming tracking spaces are provided in every other intermeshed link end junction. Although such an embodiment has fewer tracking spaces, which limits the number of possible sprocket positions, it also provides fewer short paths via the tracking spaces through which grit can enter the pivot rod hole.

In yet another embodiment, the link ends have a constant width with a groove in the sprocket-side of each link end providing the tracking space. This embodiment is even more impervious to contamination of the pivot rod hinge because the tracking spaces are not located between intermeshed link ends. Thus, there are no short paths to the pivot rods.

The conveyor belt constructed of such modules is driven by a drive sprocket that includes around its circumference tracking teeth, which engage the belt in the tracking spaces to keep the belt from sidewise disengagement, and twin-peak driving teeth forming recesses for receiving the tooth members of the belt modules so as to provide the force needed to drive the belt.

Thus, the invention combines superior conveyor performance with longer life in highly abrasive environments than previously possible.

BRIEF DESCRIPTION OF THE DRAWINGS

Other objects, features, and advantages of the invention will become more fully apparent from the following description, the appended claims, and the accompanying drawings, in which:

THE PREFERRED EMBODIMENTS

Figure 1:
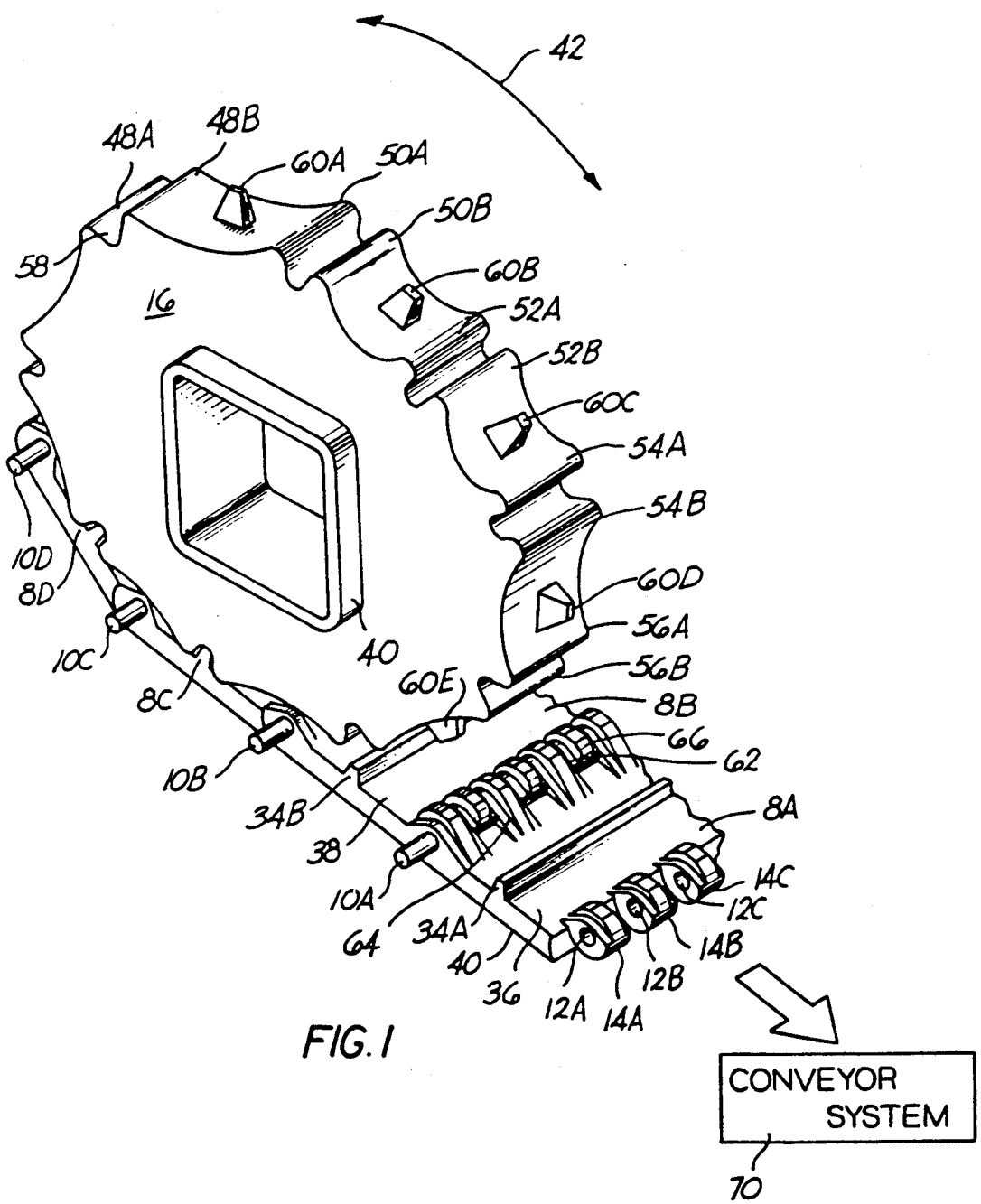
FIG. 1 is a partially sectional perspective view of a portion of a plastic modular conveyor belt and sprocket, which illustrates the unique tracking and drive technique and the closed-hinge pivot rod holes of the conveyor belt of this invention.

As may be seen from FIG. 1, smooth-topped conveyor modules 8A-8D are pivotally connected by pivot rods 10A-10D, which extend through apertures such as apertures 12A-C in link ends 14A-C in module 8A. Although only three link ends are shown on one end and four on the other end for each module, many more per module are feasible. Furthermore, the smooth-topped conveyor surface could also be perforated. Each of the modules further includes a single transverse tooth member 34A or 34B integrally molded to a sprocket-side surface 36 or 38 of the connecting structure of module 8A or 8B. The transverse tooth members engage with twin-peak teeth 48A and 48B, 50A and 50B, 52A and 52B, 54A and 54B, and 56A and 56B located on the circumference of a drive sprocket 16. A recess, such as 58 defined by twin-peak teeth 48A and 48B, is sized larger than the dimensions of the transverse tooth members so that the recess can straddle the member and provide a driving force in either direction as indicated by the double-headed arrow 42 in response to a rotational force applied to the sprocket 16 via a hub member 40.

Because the transverse tooth members, such as tooth member 34A, are continuous and extend substantially from one module edge to the other, the recesses of the sprocket 16, which receive the tooth members could slide from edge to edge of a module. Thus, tracking, i.e., preventing sidewise movement of the belt with respect to the sprocket, is not achieved by the normal engagement of the sprocket recesses with the tooth members of the modules. Consequently, the sprocket 16 also includes narrow tracking teeth 60A-E along its circumference between the twin-peak drive teeth 48, 50, 52, 54, and 56. To receive these tracking teeth on the sprocket, shallow notches, or tracking spaces, such as space 62 between link ends 64 and 66, are provided by the sprocket-side portions of intermeshed link ends. The engagement of tracking teeth on the sprocket with shallow notches on the modules provides the tracking necessary to prevent sidewise motion of the belt relative to the sprocket.

Further details of the construction of a conveyor system 70 using the belt modules of the invention are disclosed in J. M. Lapeyre U.S. Pat. No. 4,925,016, issued May 15, 1990, entitled "Heavy Duty Modular Conveyor Belt And Sprocket With Unique Tracking," and incorporated herein by reference.

Dirt, grit, and other contamination trapped between two relatively moving objects cause frictional wear in both those objects. In belts, grit trapped between pivot rods and the walls of pivot rod apertures, which move relative to each other, causes both to wear, shortening the life of the belt. Typically, grit makes its way to the pivot rod hole through openings between intermeshed link ends of contiguous modules. In uncontrolled abrasive environments, the wear can be substantial. Ways of minimizing such wear include: a) narrowing the paths by which contaminants make their way to the pivot rod apertures; b) lengthening the paths; and c) reducing the number of available paths.

Figure 2:
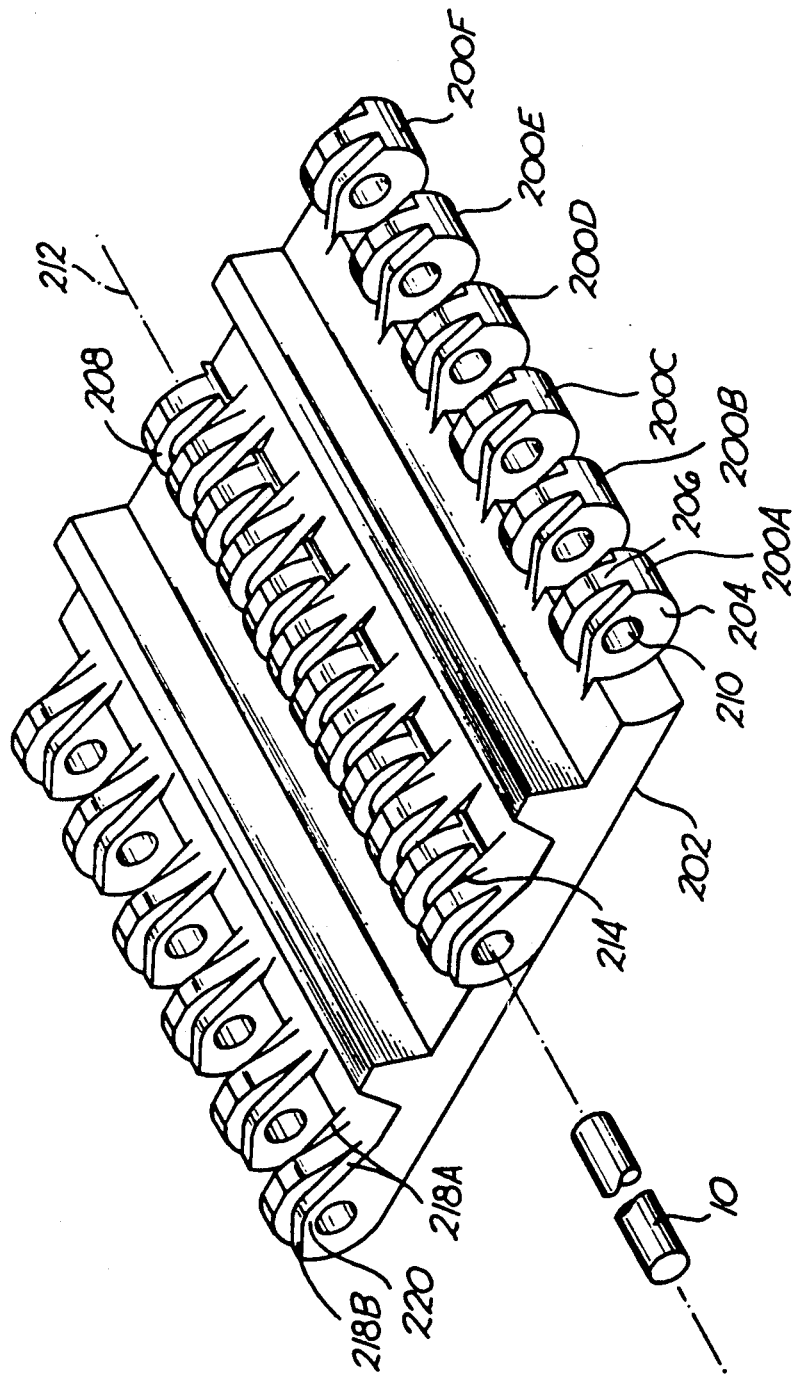
FIG. 2 is a sprocket-side perspective view of a portion of the belt of FIG. 1 more clearly showing the tracking spaces between intermeshed link ends.

As shown in FIG. 1, but better illustrated in FIG. 2 to which the following description refers, link ends 200A-F of module 202 include a load-side portion 204 having a width only slightly less than the spacing between consecutive link ends on a module. The slight difference between the width of the load-size portion and the spacing between consecutive link ends on a module ensures a substantially smooth load-carrying surface for a belt constructed of modules of such intermeshed link ends. The link ends further include a sprocket-side portion 206 having a width less than the load-side portion to provide tracking spaces 208 between intermeshed link ends for receiving the tracking teeth of drive sprockets. The wider load-side portion of each link end contains a pair of sloped faces 218 A-B forming a ridge 220 flanking the sprocket-side portion, which is spaced about midway between each side of the link end. Although the sloped faces 218 A-B shown are substantially of a constant slope, or flat, they could also be of varying slope, or curved. The load-side portion further defines a pivot rod aperture 210, thereby providing a substantially closed-hinge pivot rod hole along the entire width of the belt when the link ends, with their included apertures, are intermeshed. The axis of the pivot rod hole is indicated by dashed line 212. To make its way to the pivot rod hole, grit must pass through the extremely narrow gaps 214 between intermeshed link ends. Thus, the resulting closed hinge resists abrasion.

Figure 3:
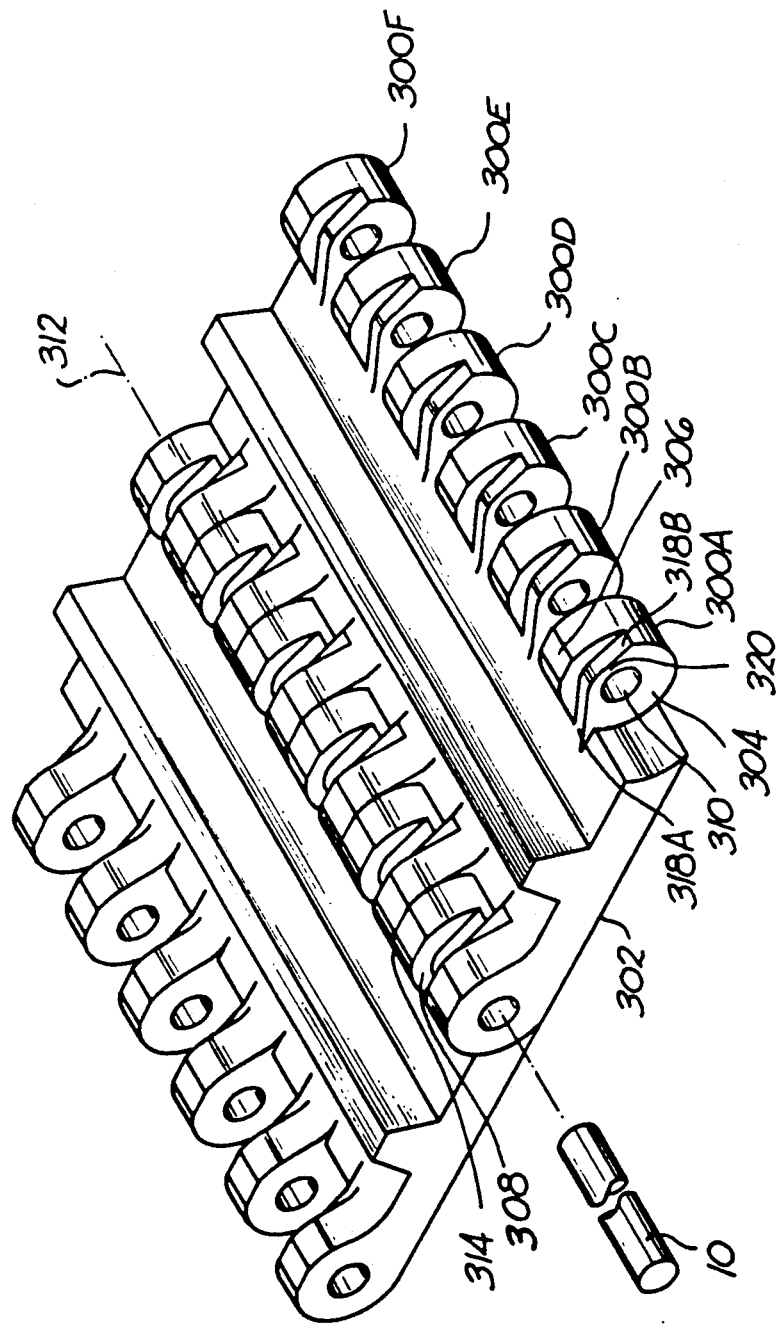
FIG. 3 is a sprocket-side perspective view of a second embodiment of the link ends in which the tracking spaces are between alternate junctions of intermeshed link ends.

In another embodiment, shown in FIG. 3, access to the pivot rod holes by grit is further inhibited by lengthening some of the access paths. Link ends 300A-F of module 302 include a load-side portion 304 having a width only slightly less than the spacing between consecutive link ends on a module. The link ends further include a sprocket-side portion 306 narrower than the load-side portion, but having one side in common with the load-side portion. Thus, a tracking space 308 is formed at alternate junctions between intermeshed link ends. The wider load-side portion of each link end contains a pair of sloped faces 318 A-B forming a ridge 320 opposite the common side of both portions. Although the sloped faces 318 A-B shown are substantially of a constant slope, or flat, they could also be of varying slope, or curved. The load-side portion further defines a pivot rod aperture 310, thereby providing a substantially closed-hinge pivot rod hole along the entire width of a belt constructed of such modules. The axis of the pivot rod hole is indicated by dashed line 312. The access path for grit between intermeshed link ends is longer along the narrow gaps 314 in which tracking spaces are not provided. Thus, a closed-hinge belt according to this embodiment is more resistant to abrasion because it provides fewer short access paths to the pivot rod hole.

Figure 4:
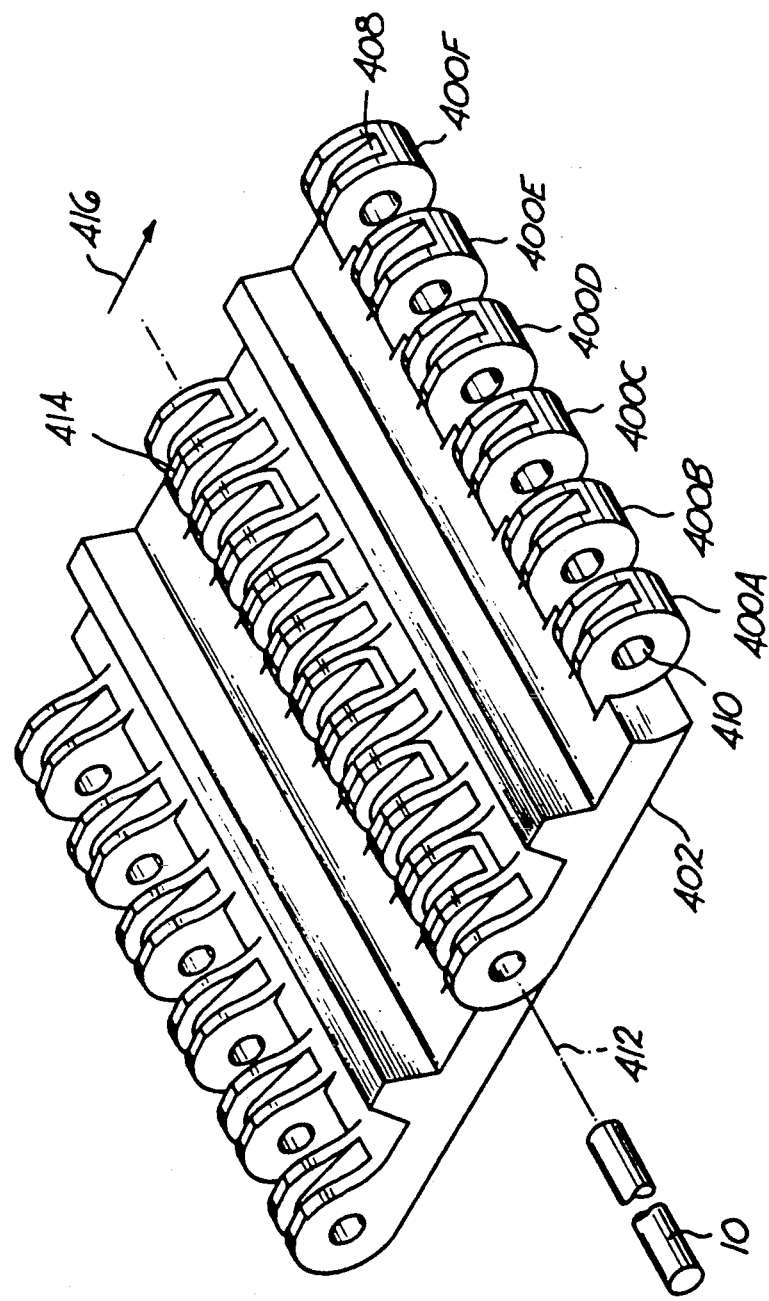
FIG. 4 is a sprocket-side perspective view of a third embodiment of link ends having tracking spaces grooved into the sprocket-side portions of the link ends.

FIG. 4 shows another closed-hinge embodiment even more resistant to abrasion. Link ends 400A-F of module 402 have a width only slightly less than the spacing between consecutive link ends on a module, ensuring a substantially smooth load-carrying surface. The link ends define pivot rod apertures 410, thereby providing a substantially closed-hinge pivot rod hole along the entire length of a belt constructed of such intermeshed modules. The axis of the pivot rod hole is indicated by dashed line 412. A groove 408 in the bottom of each link end in the direction of belt travel 416 is sized to receive the tracking teeth of drive sprockets. Because tracking is achieved by means of the groove, which is more or less midway along the sprocket-side of each link end, instead of by means of tracking spaces in the gaps between intermeshed link ends, access to the closed-hinge pivot rod hole is restricted to a path along the long, narrow gap 414 between intermeshed link ends. Greater resistance to abrasion is thereby provided.

It is therefore evident that this invention has advanced the state of the art and those novel features descriptive of the spirit and nature of this invention are set forth with particularity in the following claims.

I claim:

1. In a modular conveyor belt system formed of interconnected belt links of the type wherein tracking teeth are interposed laterally over the belt width in receptacle notches formed by the belt links to retain the links laterally in place along a track, the improvement comprising:

shallow notches formed in link end structure that encompasses a pivot rod hole to a depth ensuring that pivot rods in said hole are completely surrounded by the link end structure surrounding the hole across the width of the belt.

2. The belt system of claim 1, wherein the shallow notches are formed between adjacent interconnected link ends.

3. The belt system of claim 1, wherein the shallow notches are formed within each link end.

4. The belt system of claim 1, wherein the shallow notches are formed between alternate adjacent interconnected link ends.

5. In a modular conveyor belt system formed of interconnected belt modules having link ends connected by integrally molded connecting structure, the belt modules being of the type wherein tracking teeth are interposed laterally over the belt width in receptacle notches formed by the link ends of the belt modules to retain the belt modules laterally in place along a track, the improvement comprising:

shallow notches formed in link end structure that encompasses a pivot rod hole to a depth ensuring that pivot rods in said hole are completely surrounded by the link end structure surrounding the hole across the width of the belt.

6. The belt system of claim 5, wherein the shallow notches are formed between adjacent interconnected link ends.

7. The belt system of claim 5, wherein the shallow notches are formed within each link end.

8. The belt system of claim 5, wherein the shallow notches are formed between alternate adjacent interconnected link ends.

9. A belt link module having a top surface and a bottom surface and first and second pluralities of link ends and suitable for being pivotally connected with a multiplicity of similar modules by pivot rods to construct a conveyor belt driven by a sprocket having tracking teeth, each link end comprising:

a first portion having a first width from side to side; and a second portion having a second width greater than said first width;

said second portion extending from said top surface and forming a part of said bottom surface and having two sloped faces opposite said top surface, said sloped faces forming a ridge;

said second portion further encompassing a pivot rod aperture therethrough, said pivot rod aperture being formed between said ridge and said top surface;

said first portion extending from said sloped faces away from said top surface to provide a guide for tracking a sprocket tooth when a multiplicity of said modules are connected by pivot rods through said pivot rod apertures to form a conveyor belt.

10. The belt link module of claim 9, wherein said first and second portions have a common side.

11. The belt link module of claim 9, wherein said first portion is positioned midway from side to side of said second portion.

12. A belt link module having a top surface and a bottom surface and first and second pluralities of link ends and suitable for being pivotally connected with a multiplicity of similar modules by pivot rods to construct a conveyor belt driven in a direction of travel by a sprocket having tracking teeth, wherein each link end extends from said top surface and forms a part of said bottom surface, each link end encompassing a pivot rod aperture therethrough lateral to the direction of travel and further forming a shallow groove positioned opposite said top surface and in the direction of travel of a conveyor belt constructed of a multiplicity of said modules, said groove being adapted to receive a tracking tooth of a drive sprocket.

13. A conveyor system comprising:
a multiplicity of belt link modules connected end-to-end in a direction of travel, each of said belt link modules including:
first and second pluralities of link ends;
said first plurality of link ends defining pivot rod apertures aligned along a first pivot axis and said second plurality of link ends defining pivot rod apertures aligned along a second pivot axis, said first plurality of link ends being intermeshed with link ends of a similar module and said second plurality of link ends being intermeshed with link ends of another similar module;
said first and second pluralities of link ends having load-side portions and sprocket-side portions, said load-side portions encompassing said pivot rod apertures and having a width selected such that said load-side portions of said link ends being intermeshed are substantially in contact and provide a substantially continuous load-carrying belt surface and said pivot rod apertures of said link ends being intermeshed provide a pivot rod hole completely encircled by said load-side portions, said sprocket-side portions defining tracks of a selected size in said link ends; and
an integrally molded connecting structure between said link ends having a sprocket-side surface and a substantially continuous load-carrying surface for joining said first and second pluralities of link ends, said connecting structure including a transverse tooth member integrally molded to said sprocket-side surface and located midway between said first and second pluralities of link ends, said tooth member having a driving surface defined on at least one side of said tooth member for receiving a driving force to move said module and a conveyor belt constructed from a multiplicity of said modules in said direction of travel;
said conveyor system further comprising a multiplicity of pivot rods each extending through said pivot rod hole to connect the modules as a conveyor belt; and
at least one drive sprocket arranged in driving relationship along a shaft oriented transverse to said direction of travel, each said sprocket including a plurality of recesses located around the circumference of said sprocket for receiving said tooth members of said modules and for providing driving forces to said module, and a plurality of tracking teeth located between said recesses, said tracking teeth having a width less than said tracks and extending radially from said circumference to mate with said tracks provided by said sprocket-side portions of said intermeshed link ends.

14. The conveyor system of claim 13 wherein said load-side portions of said link ends are wider than said sprocket-side portions.

15. The conveyor system of claim 14 wherein said sprocket-side portions are positioned substantially midway along the width of said load-side portions, whereby tracks are provided between intermeshed link ends.

16. The conveyor system of claim 14 wherein said sprocket-side portions have a common face with said load-side portions such that tracks are positioned between alternate intermeshed link ends.

17. The conveyor system of claim 13 wherein said sprocket-side portions include a shallow groove positioned opposite said load-side portions and aligned in said direction of travel.

* * * * *